(12) United States Patent
Yamada et al.

(10) Patent No.: US 7,717,757 B2
(45) Date of Patent: May 18, 2010

(54) CASSETTE RELAY BLOCK ATTACHMENT STRUCTURE

(75) Inventors: Hiroaki Yamada, Ogasa-gun (JP); Nobutaka Kaneko, Ogasa-gun (JP); Hiroaki Kamo, Ogasa-gun (JP); Katsuji Suzuura, Toyota (JP)

(73) Assignee: Yazaki Corporation, Tokyo (JP)

( * ) Notice: Subject to any disclaimer, the term of this patent is extended or adjusted under 35 U.S.C. 154(b) by 595 days.

(21) Appl. No.: 10/539,010

(22) PCT Filed: Jul. 23, 2004

(86) PCT No.: PCT/JP2004/010865

§ 371 (c)(1), (2), (4) Date: Jun. 15, 2005

(87) PCT Pub. No.: WO2005/023597

PCT Pub. Date: Mar. 17, 2005

(65) Prior Publication Data

US 2006/0154532 A1 Jul. 13, 2006

(30) Foreign Application Priority Data

Sep. 5, 2003 (JP) ............................. 2003-313876

(51) Int. Cl.
*H01R 13/502* (2006.01)
(52) U.S. Cl. .................................................... 439/701
(58) Field of Classification Search ................. 439/701, 439/541.5, 949, 76.2
See application file for complete search history.

(56) References Cited

U.S. PATENT DOCUMENTS

| 3,514,743 | A | | 5/1970 | Shantz | |
| 5,902,155 | A | * | 5/1999 | Polgar et al. | 439/680 |
| 5,957,732 | A | * | 9/1999 | Ito et al. | 439/752 |
| 6,017,250 | A | * | 1/2000 | Tsuji et al. | 439/701 |
| 6,022,247 | A | | 2/2000 | Akiyama et al. | |
| 6,196,882 | B1 | | 3/2001 | Sato et al. | |
| 6,375,517 | B1 | * | 4/2002 | Okabe et al. | 439/701 |
| 6,443,779 | B2 | * | 9/2002 | Suzuki | 439/701 |

(Continued)

FOREIGN PATENT DOCUMENTS

EP 0 818 356 A2 1/1998

(Continued)

OTHER PUBLICATIONS

Japanese Office Action dated Jun. 30, 2008.

*Primary Examiner*—T C Patel
*Assistant Examiner*—Vladimir Imas
(74) *Attorney, Agent, or Firm*—Sughrue Mion, PLLC (57) ABSTRACT

Lock portions 4 are provided more inside than outermost wall surfaces 5a, 6a of a cassette relay block 1, and the cassette relay block 1 is inserted into space surrounded by peripheral walls 16 to 19 on an attaching side, and fixed by the lock portions 4 and locked portions 10 located on the peripheral wall side. The peripheral walls 16 to 19 on the attaching side are formed as a cassette frame 2. The cassette frame is used in common for the cassette relay block 1 or other cassette electric parts mounting blocks. The plural cassette frames are coupled to each other by lock members 54, and coupled to a connection box body by locked members thereby to constitute an electric connection box.

9 Claims, 8 Drawing Sheets

U.S. PATENT DOCUMENTS

| | | | |
|---|---|---|---|
| 6,609,929 B2 * | 8/2003 | Kamarauskas et al. | 439/541.5 |
| 6,821,161 B1 * | 11/2004 | Cao | 439/701 |
| 2002/0106942 A1 * | 8/2002 | Sakurai et al. | 439/701 |
| 2003/0109150 A1 * | 6/2003 | Saka et al. | 439/76.2 |
| 2004/0235361 A1 * | 11/2004 | Cao | 439/701 |

FOREIGN PATENT DOCUMENTS

| | | |
|---|---|---|
| FR | 2 742 004 A1 | 6/1997 |
| JP | 45-33000 U | 12/1970 |
| JP | 53-39491 U | 4/1978 |
| JP | 59-82975 U | 6/1984 |
| JP | 61-74218 U | 5/1986 |
| JP | 3-7602 U | 1/1991 |
| JP | 6-9325 U | 2/1994 |
| JP | 7-123567 A | 5/1995 |
| JP | 7-130412 A | 5/1995 |
| JP | 09-140029 A | 5/1997 |
| JP | 2000-003761 A | 1/2000 |
| JP | 2002-84633 A | 3/2002 |
| JP | 2002-315156 A | 10/2002 |
| JP | 2002-315157 A | 10/2002 |
| JP | 2003-125516 A | 4/2003 |

* cited by examiner

CASSETTE RELAY BLOCK ATTACHMENT STRUCTURE

TECHNICAL FIELD

The present invention relates to cassette relay block attachment structure in which a relay block in an automobile can be attached into an electric connection box in cassette form.

BACKGROUND ART

FIGS. 10(A) and (B) show one example of an electric connection box having the conventional cassette relay block attachment structure, for example, as shown in Unexamined Japanese Patent Publication 2003-125516.

Figure 10:
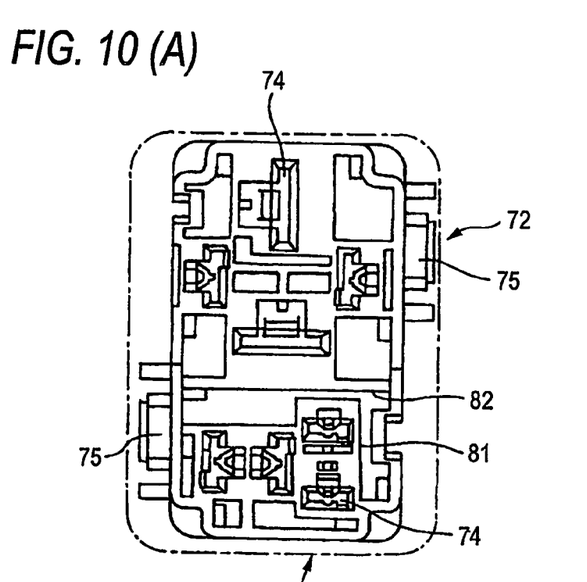

This cassette relay block 72, as shown in an enlarged view shown in a circle in FIG. 10 (B), is formed of insulation resin and nearly in the shape of a rectangular parallelepiped externally, and has plural terminal housing rooms 74 for inserting and fixing female terminals 73 (FIG. 11) from the downside in its required positions; and lock arms 75 for a connection box body 79 are provided respectively on outer wall surfaces on both sides of the cassette relay block 72. The terminal housing room 74 continues to a relay terminal insertion hole located on the upside. The cassette relay block 72 in this example has two different relay insertion parts 81 and 82.

Figure 11:
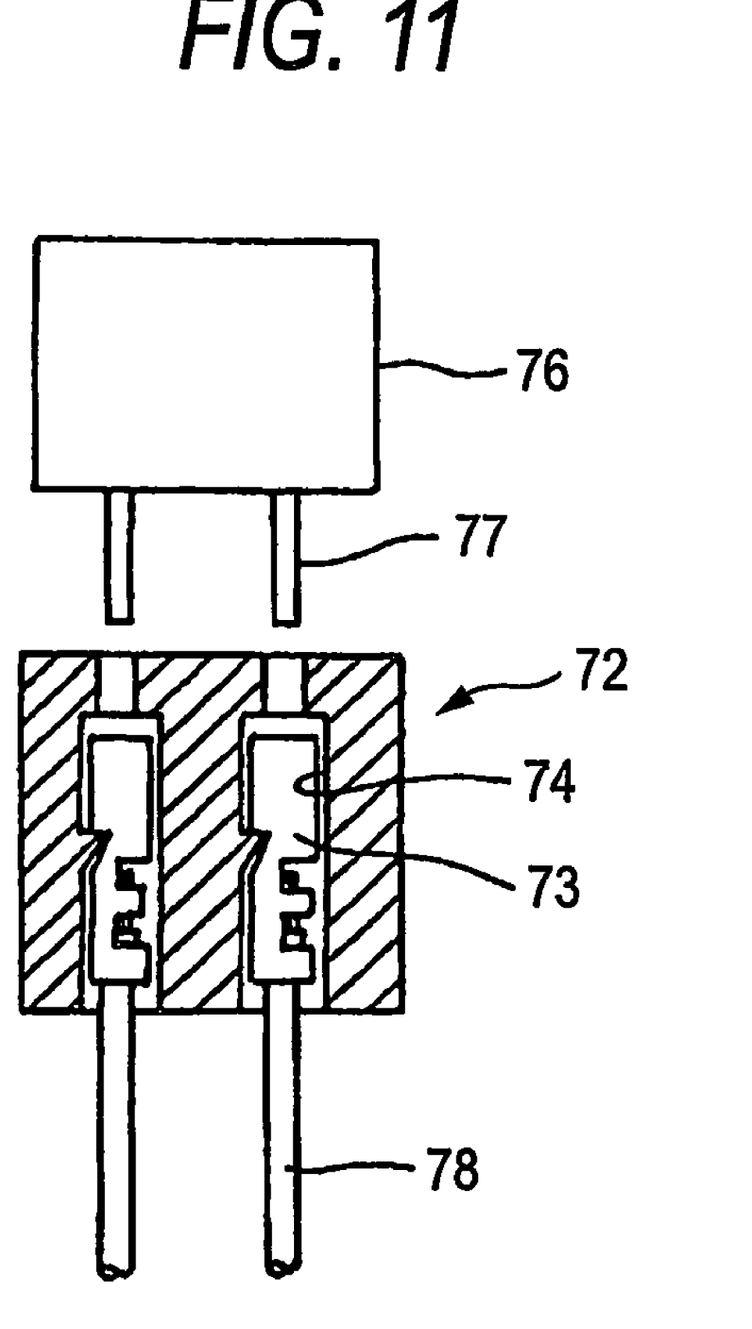
FIG. 11 is a longitudinal cross sectional view showing an example of a connection form between a conventional cassette relay block and a relay.

As shown in FIG. 11, into the female terminal 73 in the terminal housing room 74, a male terminal 77 of a relay 76 is inserted and connected. The female terminal 73 is pressure-connected to an electric wire 78, and the electric wire 78 is, for example, connected to a fuse in the connection box body 79 or an external load. In place of the electric wire in the connection box body 69, a bus bar may be used.

As shown in FIG. 10(A), to the connection box body 79 made of synthetic resin, plural kinds of cassette relay blocks 72 are fixed by the lock arms 75. The connection box body 79 has an insertion hole for the cassette relay block 72, and a fitting projection (not shown) for the lock arm 75 on an inner wall surface of the insertion hole 83.

Onto an electric connection box 71, in addition to the cassette relay block 72, electric parts such as a fuse and the like are frequently mounted. The connection box body 79, the plural cassette relay blocks 72, and the fuse (at least the connection box body 79 and the plural cassette relay blocks 72) constitute the electric connection box 71.

However, in the above conventional cassette relay block attachment structure, the lock arm protrudes from the outer wall surface of the cassette relay block, and protrudes outward more greatly than the external form of the relay that is the electric part. Therefore, since the large lock space is required, there is a problem that the cassette relay block and the connection box body for housing the cassette relay block are made large. Further, since the connection box body and the plural kinds of cassette relay blocks must be resin-molded for each car type, various metal molds are required, so that there is a problem that many manufacturing costs and manufacturing delivery times are required.

DISCLOSURE OF INVENTION

In view of the above problems, it is an object of the invention to provide cassette relay block attachment structure in which the useless space for the lock portion is eliminated thereby to enable size reduction, and versatility for each car type is heightened thereby to enable low-cost and quick manufacture of the electric connection box.

In order to achieve the above object, cassette relay block attachment structure according to the first aspect of the invention is provided in that: a lock portion is provided more inside than an outermost wall surface of a cassette relay block; and the cassette relay block is inserted into space surrounded by peripheral walls on an attaching side, and fixed by the lock portion and a locked portion located on the peripheral wall side.

By the above constitution, the cassette relay block is inserted and fixed with one touch into peripheral walls of a housing hole of the connection box body that becomes a base of an electric connection box or its peripheral walls of a frame attached into the connection box body. Further, since the lock portion is arranged more inside than the outermost wall surface of the cassette relay block, and it does not protrude outward from the outer wall surface, the cassette relay block is compactified.

The cassette relay block attachment structure according to the second aspect of the invention is provided in that in the cassette relay block attachment structure of the first aspect, the lock portion and locked portion are housed in the projected area of a relay attached to the cassette relay block.

By the above constitution, the plural relays can be arranged in the electric connection box at a narrow pitch thereby to enable size reduction of the electric connection box.

The cassette relay block attachment structure according to the third aspect of the invention is characterized in that in the cassette relay block attachment structure according to the first or second aspect, terminal housing parts of the cassette relay block are arranged crosswise, and the lock portion is arranged in a range surrounded by crossing outer wall surfaces of the terminal housing parts.

By the above constitution, the dead space outside the crossing part of the cassette relay block is effectively utilized as lock space, so that the cassette relay block is smartened and compactified.

The cassette relay block attachment structure according to the fourth aspect of the invention is provided in that in the cassette relay block attachment structure according to the any one of the first to third aspects, the lock portion is a flexible lock arm.

By the above constitution, the comparatively large-sized lock arm that requires flexure space is arranged by the effective utilization of the dead space without the strain. By pressing the lock arm in the flexure direction, lock release is readily performed.

The cassette relay block attachment structure according to the fifth aspect of the invention is provided in that in any one of the first to fourth aspects, a rib is provided on the opposite side to the lock portion side and for one of the cassette relay block and the peripheral wall, and a guide groove for slide engagement with the rib is provided for the other.

By the above constitution, the rib slides into the guide groove and fits thereto, whereby positioning and prevention of rattling of the cassette relay block in the peripheral walls are performed. Since the rib and the guide groove are arranged on the opposite side to the lock portion side, a tilt of the cassette relay block is prevented at the insertion time into the peripheral walls, so that the insertion is performed smoothly and surely.

The cassette relay block attachment structure according to the sixth aspect of the invention is provided in that in the cassette relay block attachment structure according to any one of the first to fifth aspects, the peripheral walls on the attaching side are formed as a cassette frame.

By the above constitution, the cassette relay block is inserted and fixed into the cassette frame, and the cassette relay block and the cassette frame constitute a relay block assembly. The cassette relay block is protected in the cassette frame from interference with the outside. Hereby, by coupling the plural relay block assemblies to each other, the plural cassette relay blocks can be arranged in parallel.

The cassette relay block attachment structure according to the seventh aspect of the invention is provided in that in the cassette relay block attachment structure according to the sixth aspect, the cassette frame is used in common for the cassette relay block or other cassette electric parts mounting blocks.

By the above constitution, since one kind of cassette frame is used in common, various cassette electric parts mounting blocks such as the cassette relay block, a cassette fuse block, and a relay/fuse mix block can be appropriately attached. For example, in case that specification of the electric connection box is changed for each car type, by attaching the predetermined cassette electric parts mounting block according to the specification to each cassette frame, the plural kinds of electric parts mounting block assemblies can be constituted, and by coupling the electric parts block assemblies to each other, the desired electric parts mounting block arrangement can be obtained.

The cassette relay block attachment structure according to the eighth aspect of the invention is provided in that in the cassette relay block attachment structure according to the sixth or seventh aspect, the inner surfaces of the peripheral walls are housed in the projected area of the relay.

By the above constitution, the lock portion and the locked portion are arranged in the cassette frame in a space saving state. Further, for example, in an electric connection box into which the cassette frame is attached, plural relays are arranged at a narrow pitch, so that size reduction of the electric connection box is possible.

The cassette relay block attachment structure according to the ninth aspect of the invention is provided in that in the cassette relay block attachment structure according to any one of the sixth to eighth aspects, the plural cassette frames are coupled to each other by lock members, and coupled to a connection box body by locked members thereby to constitute an electric connection box.

By the above constitution, the cassette frames are coupled to each other by the lock members, and the cassette parts mounting blocks such as the cassette relay block and the cassette fuse block in the cassette frames are arranged in a row or in plural rows in parallel. The plural electric parts block assemblies of which each comprises the cassette frame and the cassette parts mounting block are coupled to each other thereby to constitute an electric parts mounting block assembly group. The electric parts mounting block assembly group is housed and fixed into a connection box body that is a lower cover, and constitutes the electric connection box together with the relay and the fuse.

According to the first aspect of the invention, since the lock portion is arranged more inside than the outermost wall surface of the cassette relay block, the cassette relay block is compactified, so that size reduction of the electric connection box into which the cassette relay block is attached and high-density arrangement of the cassette relay blocks are possible.

According to the second aspect of the invention, the plural relays can be arranged in the electric connection box at the narrow pitch thereby to enable the size reduction of the electric connection box more.

According to the third aspect of the invention, since the dead space outside the crossing part of the cassette relay block is effectively utilized, the cassette relay block is surely compactified, and size and weight reduction of the metal mold is possible.

According to the fourth aspect of the invention, the sure lock power is obtained with one touch by using the flexible lock arm, and lock release is easy. Therefore, attachment and detachment works of the cassette relay block are facilitated, and attachment work property and maintenance property of the electric connection box improve.

According to the fifth aspect of the invention, by the slide fitting between the rib and the guide groove, the tilt and rattling of the cassette relay block in the insertion into the peripheral walls are performed, so that the insertion is performed smoothly and surely. Therefore, the attachment work property of the cassette relay block improves, and wear and unusual sound due to vibration after the attachment to a vehicle are prevented.

According to the sixth aspect of the invention, without using the housing hole or space of the connection box body as the attaching side, the housing hole or space is provided into the cassette frame. Therefore, for example, by coupling the plural assemblies of which each comprises the cassette frame and the cassette relay block to each other, the plural cassette relay blocks can be readily arranged and fixed in a space saving manner.

According to the seventh aspect of the invention, one kind of cassette frame is used in common, and the various electric parts mounting block assemblies can be readily obtained. Therefore, this invention can correspond to the change of specification of the electric connection box readily and quickly at a low cost.

According to the eighth aspect of the invention, in the electric connection box using the cassette frame, the plural relays are arranged at the narrow pitch, so that size reduction of the electric connection box is possible.

According to the ninth aspect of the invention, by combining the required cassette electric parts mounting blocks for each car type, the electric connection boxes which are different in specification can be formed readily and quickly at a low cost. Therefore, this invention can correspond to the design change and new installation of the electric connection box readily.

BRIEF DESCRIPTION OF THE DRAWINGS

FIG. 10 (A) is a plan view showing an example of an electric connection box having a conventional cassette relay block;

FIG. 10 (B) is an enlarged view of a cassette relay block shown in FIG. 10(A)

BEST MODE FOR CARRYING OUT THE INVENTION

Figure 1:
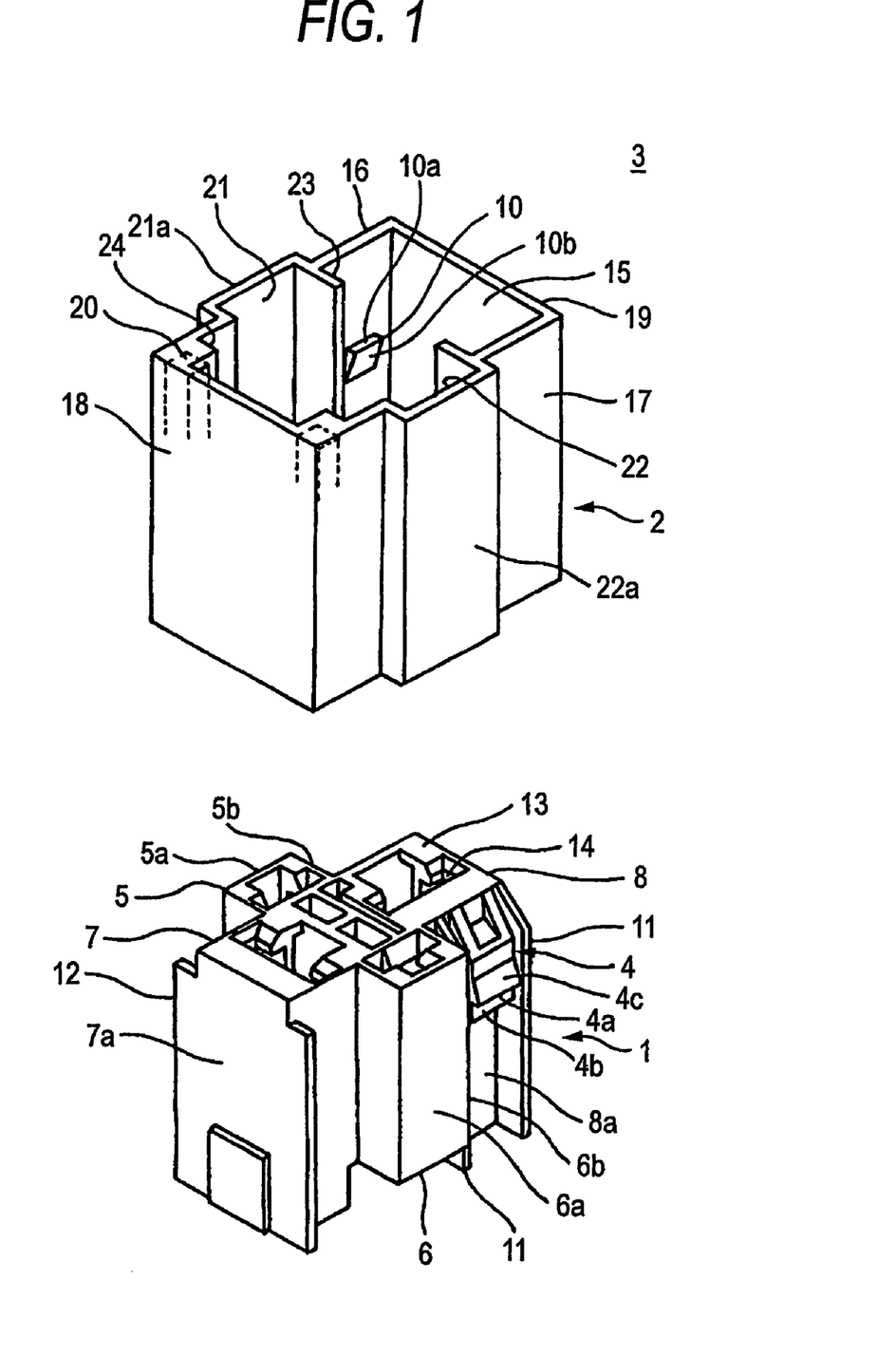
FIG. 1 is an exploded perspective view showing one embodiment cassette relay block attachment structure according to the invention.

FIG. 1 shows one embodiment of cassette relay block attachment structure according to the invention.

In this cassette relay block attachment structure, a single-pole cassette relay block 1 is fixed in a rectangular cassette frame (attaching side) 2 by a lock arm (lock portion) 4. The cassette relay block 1 and the cassette frame 2 constitute a relay block assembly 3.

The cassette relay block 1 made of insulating resin has terminal housing parts 5 to 8 which protrude crosswise in four directions, that is, in front and rear, and left and right. On front and rear outer walls of either (herein, terminal housing part 8) of the left and right terminal housing parts 7, 8, a pair of flexible lock arms 4 are provided protrusively. The respective lock arms 4 are located more inside than outermost front and rear wall surfaces 5a and 6a of the front and rear terminal housing parts 5 and 6 (without protruding outward in the front and rear directions from the front and rear outer wall surfaces). The front-rear and left-right are defined for convenience of description, and they do not always coincide with the use direction of the cassette relay block 1.

The lock arm 4 is integrally raised from the upper end side of the outer wall 8a of the terminal housing part 8 and extends downward (perpendicularly). Further, the lock arm 4 has a different-in-level horizontal fixing surface 4a at a free end on the lower end side, and a perpendicular and short thin thickness part 4b for release of fixing and for press-contact with a fitting projection (locked portion) 10 located on the cassette frame 2 side on the downside of the fixing surface 4a integrally. Between the lock arm 4 and the outer wall surface 8a of the terminal housing part 8, an arm flexure space is formed, so that the lock arm 4 can bend inward.

Side surfaces of the respective lock arm 4 adjoin side walls (outer wall surfaces) 5b and 6b of the front and rear terminal housing parts 5 and 6, and the outer wall surface 4c of each lock arm 4 is located more inside than the outer wall surface 5a, 6a of the front and rear terminal housing part 5, 6 (near the outer wall surface 8a on which the lock arm 4 is raised). In a rectangular range surrounded by the crossing outer wall surfaces 6b and 8a of the terminal housing parts 6 and 8 adjoining each other in the cross direction, the lock arm 4 is housed.

On the left and right sides of each lock arm 4, a pair of ribs 11 for protection and guide in insertion into the cassette frame 2 are provided protrusively in front and in rear, and the lock arm 4 is housed inside a pair of ribs 11 thereby to be protected from interference with the outside. For the wall part of either of the left and right terminal housing parts 7,8 on the opposite side to the lock arm 4 side (herein, the wall part 7a of the terminal housing part 7), ribs 12 for guide in insertion into the cassette frame 2 are provided protrusively in front and in rear.

Inside each of the terminal housing parts 5 to 8 (in a terminal housing room), a flexible fitting lance for a female terminal (not shown) is provided, and the female terminal is inserted from the downside and can be fixed to the fitting lance. For the upper end of the terminal housing room, a stopper wall 13 for the female terminal is provided, and a male terminal of a relay (not shown) is inserted into a narrow hole 14 between the stopper walls from the upside and connected to the female terminal.

The cassette frame 2 is formed of synthetic resin in the shape of a rectangular case, and has openings 15 at its upper and lower ends. Into space surrounded by front-rear and left-right wall parts (peripheral walls) 16 to 19, the cassette relay block 1 is inserted from the downside and fixed. For the upper opening 15, a stopper wall 20 for the cassette relay block 1 is provided.

In the cassette frame 2 in this example, housing recesses 21 and 22 for the front and back terminal housing parts 5 and 6 of the crosswise cassette relay block 1 are formed for the front and rear wall parts 16 and 17 protrusively. Ribs 23 for guide along the side surfaces 5b and 6b of the front and rear terminal housing parts 5 and 6 of the cassette relay block 1 are formed protrusively from the housing recesses 21 and 22. Further, for a pair of ribs 12 located on the opposite side to the lock arm 4 side of the cassette relay block 1, a pair of ribs 24 for guide into the cassette frame 2 are formed protrusively. By the both ribs 11 and 12 of the cassette relay block 1, and the ribs 23 and 24 of the cassette frame 2, the cassette relay block 1 is inserted into the cassette frame smoothly and surely without shifting and tilting.

Correspondingly to the fixing surface (fixing step part) 4a of the lock arm 4, fitting projections 10 are provided on the inner surfaces of the front and rear wall parts 16 and 17 of the cassette frame 2. The fitting projection 10 has an upward horizontal fitting surface 10a and a downward tilt guide surface 10b. The lock arm 4 of the cassette relay block 1 inserted into the cassette frame 2 from the downside slide-contacts the fitting projection 10 along the tilt guide surface 10b and bends inward. As soon as the upper end of the cassette relay block 1 comes into contact with the stopper wall 20 of the cassette frame 2, the lock arm 4 returns elastically, and the fixing surface 4a of the lock arm 4 comes into contact with the fitting surface 10a of the fitting projection 10, so that the cassette relay block 1 is surely fixed into the cassette frame 2.

Figure 2:
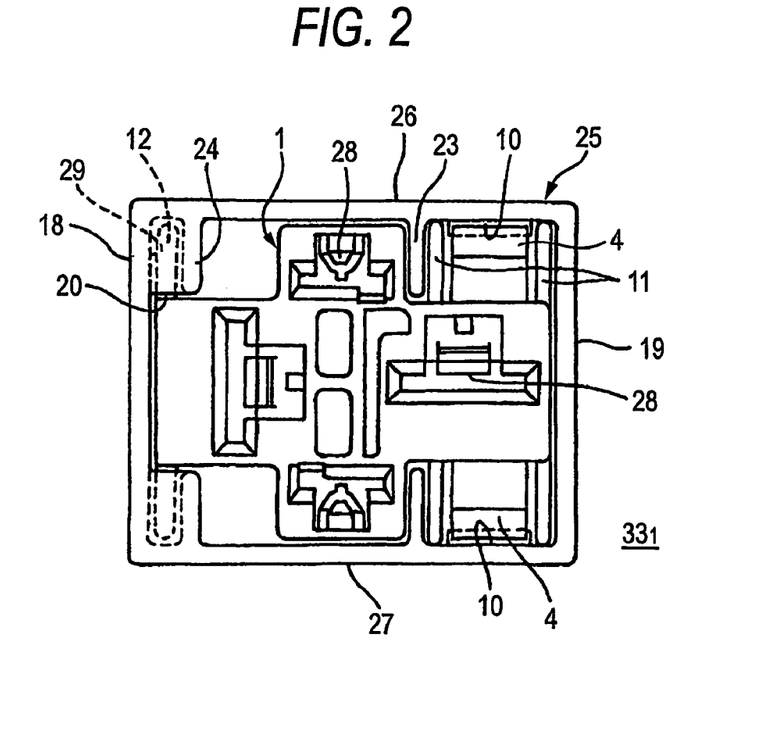
FIG. 2 is a plan view showing an example in which a cassette relay block is incorporated into a cassette frame.

The shape of the cassette frame 2 is not limited to the shape shown in FIG. 1, but may be a completely rectangular case as shown in FIG. 2. By forming the cassette frame 2 rather in the shape of the completely rectangular case without unevenness as shown in FIG. 2, the cassette frame can correspond to the cassette relay blocks 1 of various shapes. In a cassette frame 25 in FIG. 2, the outer wall surfaces 21a and 22a of the front and rear housing recesses 21 and 22 of the cassette frame 2 in FIG. 1 are extended to the left and right, whereby flat front and rear outer wall parts 26 and 27 are formed, and the distance between the front and rear wall parts, that is, the inner housing space is made wider than the inner housing space of the cassette frame 2 in FIG. 1. A cassette relay block 1 in FIG. 2 is the same as that in FIG. 1, and the cassette relay block 1 and the cassette frame 25 constitute a relay block assembly $33_1$.

As shown in FIG. 2, the cassette relay block 1 is housed and fixed into the cassette frame 25. In FIG. 2, the components similar to those in FIG. 1 are denoted by the same reference numerals and their detailed description is omitted. Reference numeral 4 is a lock arm, reference numeral 10 is a fitting projection, reference numerals 11-12, and 23-24 are guide ribs, and reference numeral 28 is a terminal-fitting lance. The ribs 23 and 24 of the cassette frame 25 are extended more inward than the ribs in FIG. 1. The ribs 11 and 23 on the arm side come into contact with each other thereby to prevent a tilt of the cassette relay block 1 in the insertion time. The rib 12 of the cassette relay block 1 is inserted into a guide groove 29 between the rib 24 of the cassette frame 25 and a wall part 18, whereby insertion property of the cassette relay block 1 heightens, and left-right opposite attachment is prevented.

Figure 3:
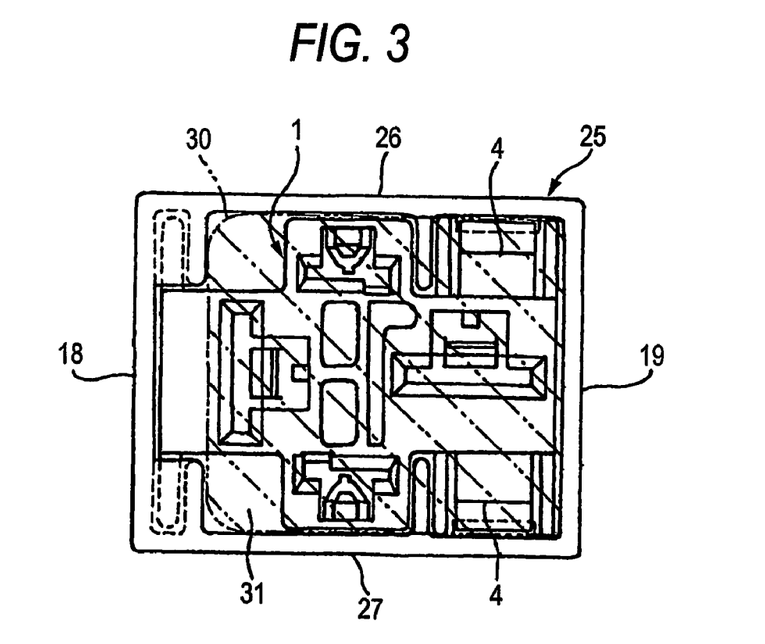
FIG. 3 is a plan view showing the attaching projected area of a relay in the cassette relay block attachment structure by hatching.

FIG. 3 shows the projected area of the relay 30 by hatching. As shown in FIG. 3, a pair of front and rear lock arms 4 of the cassette relay block 1 are housed in the projected area of the relay 30. The projected area of the relay 30 is nearly equal to the area surrounded by the front-rear and left-right wall parts 26-27 and 18-19 of the rectangular cassette frame 25. The peripheral wall parts 26-27 and 18-19 of the cassette frame 25 are nearly housed in the projected area of the relay 30.

Since the lock arms 4 are provided by use of dead spaces 31 at four corners (two corners) of the crosswise cassette relay block 1, the cassette relay block 1 and the cassette frame 3, 25 for housing the block 1 are miniaturized. Hereby, the cassette relay block 1 is nearly housed in the projected area of the relay 30. The width of the cassette block 1 in the protruding direction (front and rear directions) of a pair of lock arms 4 is surely housed in the projected area of the relay 30.

FIGS. 4 to 7 show examples in which the cassette frame 25 in FIG. 2 is used in common and cassette relay blocks or cassette fuse blocks that are different in form from one another are housed and fixed into the frame 25. The cassette relay block and the cassette fuse block are generally referred to as a cassette electric parts mounting block. Components similar to those in FIG. 2 are denoted by the same reference numerals and their detailed description is omitted.

Figure 4:
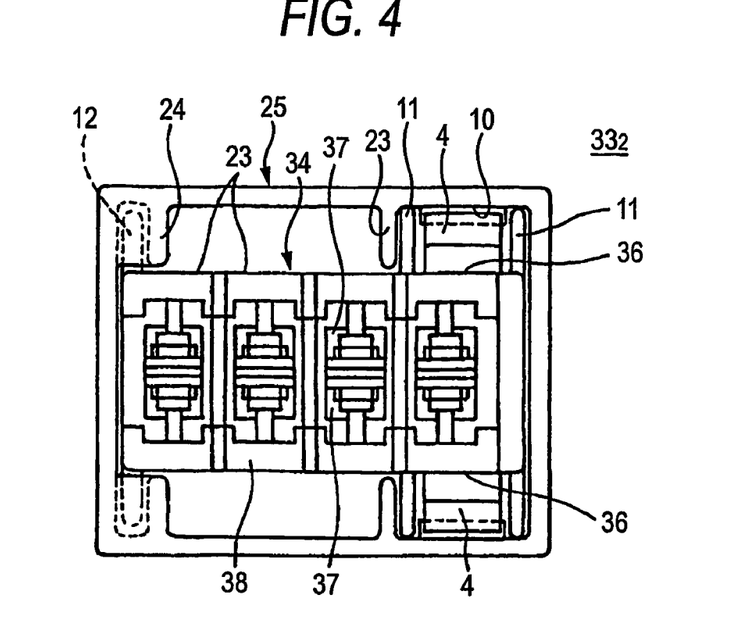
FIG. 4 is a plan view showing an example in which another cassette fuse block is attached into the common cassette frame.

A cassette fuse block 34 in FIG. 4 has four fuse attaching parts 35 arranged in parallel and formed integrally. Nearly correspondingly to the fuse attaching part located at the right end, a pair of lock arms 4 are provided protrusively from front and rear wall parts 36. Each fuse attaching part 35 has a pair of front and rear terminal housing parts 37, and positive and negative terminals are housed in the pair of terminal housing parts. On the upside of the terminal housing parts 37, a pair of front and rear fuse guide walls 38 are provided. Along the guide walls 38, a blade-shaped fuse (not shown) is inserted and attached into the block 34. On both sides of the lock arm 4 and for wall parts on the opposite side to the arm side, ribs 11-12 and 23-24 are protrusively provided respectively. The cassette fuse block 34 and the cassette frame 25 constitute a fuse block assembly $33_2$.

Figure 5:
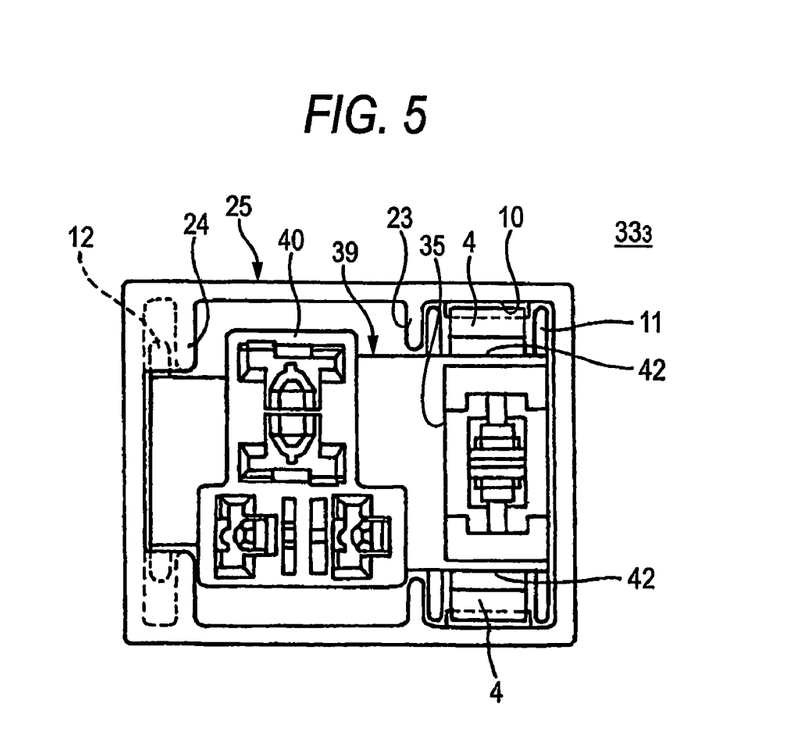
FIG. 5 is a plan view showing an example in which another cassette electric parts mounting block is attached into the common cassette frame.

In a cassette electric parts mounting block 39 shown in FIG. 5, one relay mounting part 40 and one fuse attaching part 35 are integrally arranged in parallel in the longitudinal direction (left and right directions), and lock arms 4 are provided protrusively from front and rear wall parts 42 correspondingly to the right fuse attaching part 35. On both sides of the lock arm 4 and for wall parts on the opposite side to the lock arm side, ribs 11-12 and 23-24 are protrusively provided respectively. The cassette electric parts mounting block 39 and the cassette frame 25 constitute an electric parts mounting block assembly $33_3$.

Figure 6:
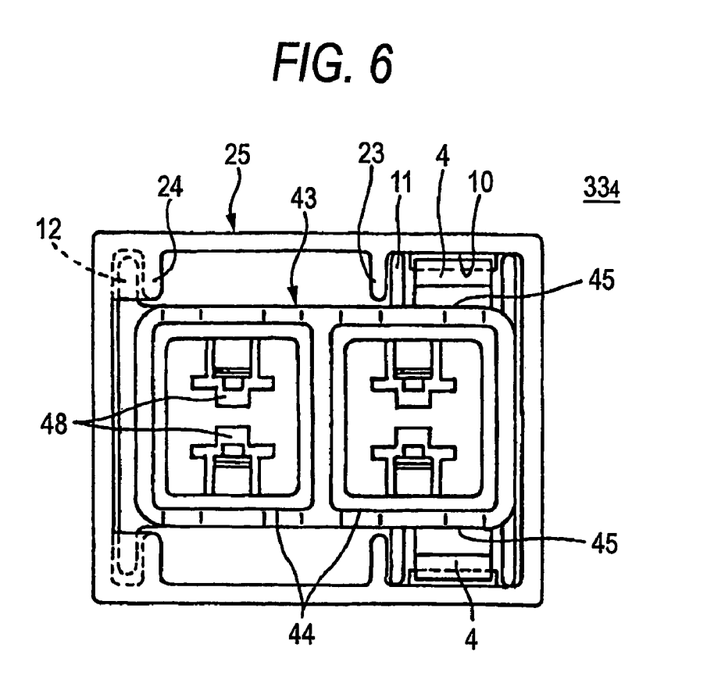
FIG. 6 is a plan view showing an example in which another cassette fuse block is attached into the common cassette frame.

In a cassette fuse block 43 shown in FIG. 6, two left and right large-sized fuse attaching parts 44 (for power source) are integrally arranged in parallel, and lock arms 4 are provided protrusively from front and rear wall parts 45 correspondingly to the right fuse attaching part 44. Each fuse attaching part 44 has a pair of terminal housing parts 46. On both sides of the lock arm 4 and for wall parts on the opposite side to the lock arm side, ribs 11-12 and 23-24 are protrusively provided respectively. The cassette fuse block 43 and the cassette frame 25 constitute a fuse block assembly $33_4$.

Figure 7:
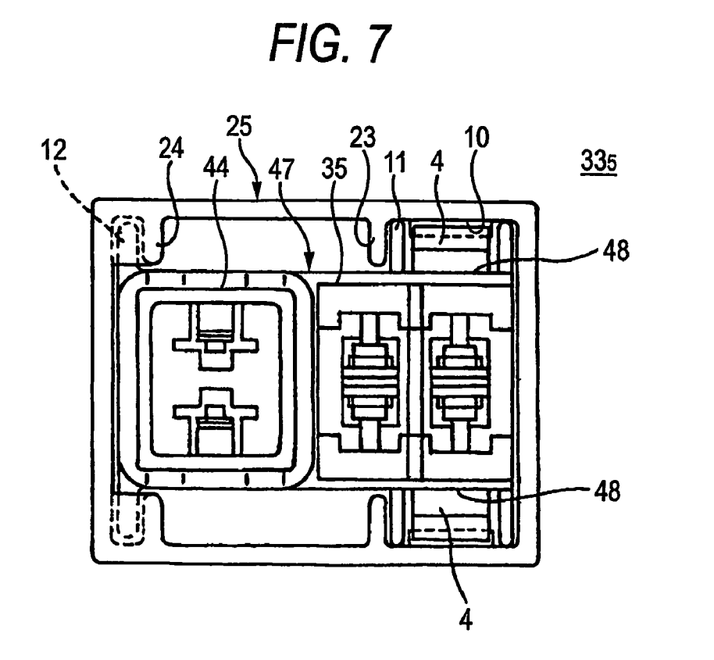
FIG. 7 is a plan view showing an example in which another cassette fuse block is attached into the common cassette frame.

In a cassette relay block 47 shown in FIG. 7, one large-sized fuse attaching part 44 and two small-sized fuse attaching parts 35 are integrally arranged in parallel, and lock arms 4 are provided protrusively from front and rear wall parts 48 correspondingly to the right fuse attaching part 35. On both sides of the lock arm 4 and for wall parts on the opposite side to the lock arm side, ribs 11-12 and 23-24 are protrusively provided respectively. The cassette fuse block 47 and the cassette frame 25 constitute a fuse block assembly $33_5$.

As shown in FIGS. 2 to 7, by use of one kind of cassette frame 25 in common, the plural kinds of cassette electric parts mounting blocks 1, 34, 39, 43, and 47 are housed and fixed, whereby the change of circuit specification of an automotive electric connection box can be readily and quickly performed at a low cost.

In the examples shown in FIGS. 1 to 7, the lock arm 4 may be provided for the inner wall surface of the cassette frame 2, 25 in place of for the cassette electric parts mounting block 1, 34, 39, 43, 47, and the fitting projection 10 may be provided for the cassette electric parts mounting block in place of for the cassette frame.

Further, as a lock means (lock member), member of various forms can be used appropriately. For example, a projection may be provided for the lock arm 4 and a fitting recess to which the projection is fitted may be provided in place of the fitting projection 10, or a fixing projection and a fitting projection or a flexible fixing claw and a fitting recess may be provided in place of the lock arm 4 and the fitting projection 10.

Further, without using the cassette frame 2, 25, a housing hole having an inner wall surface of the same form as the form of the inner wall surface of the cassette frame 2, 25 and a fitting projection 10 can be provided for a synthetic resin-made connection box body of an electric connection box (not shown) to insert and fix the cassette electric parts mounting block 1, 34, 39, 43, 47 directly into the housing hole. Further, the stopper 20 can be provided not for the upper end of the cassette frame 2, 25 but for the lower end thereby to insert the cassette electric parts mounting block 1, 34, 39, 43, 47 into the cassette frame from the upside.

Figure 8:
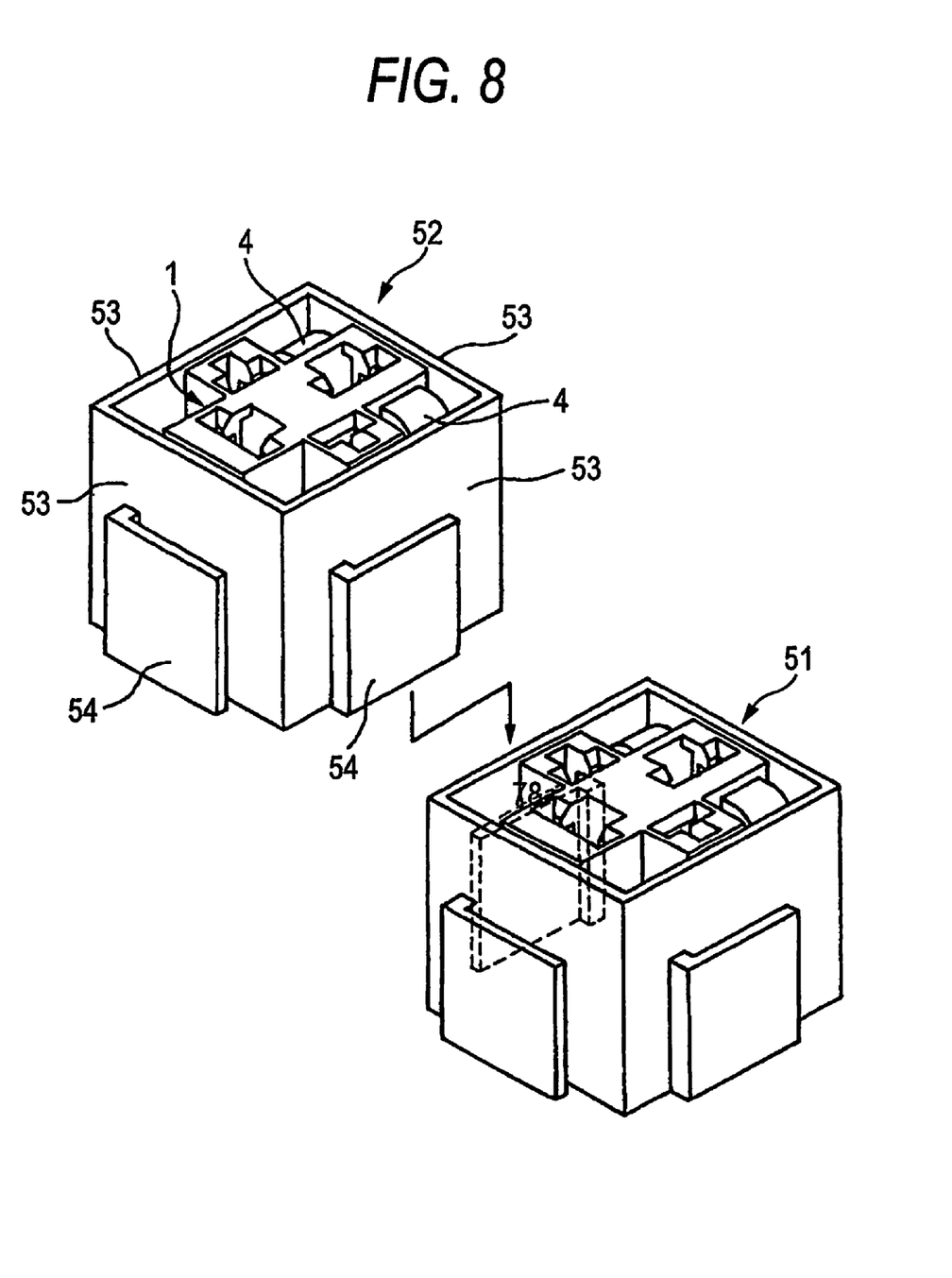
FIG. 8 is an exploded perspective view showing the structure in which relay block assemblies are coupled to each other.

FIG. 8 shows one structure example in which plural relay block assemblies 51 of which each comprises a cassette relay block 1 and cassette frame 52 which are similar to those in the above example and has the same shape are coupled to each other. Since the whole structure of the cassette relay block 1 and the inner structure of the cassette frame 52 are similar to those in the aforesaid example, their detailed description is omitted.

The cassette frame 52 has lock portions (lock means) 54 respectively on outer surfaces of front-back and left-right wall parts 53. The lock portions 54 of the respective cassette frames 52 can be coupled to each other. It is preferable from a viewpoint of common use of the cassette frame that the shape of the lock portion 54 is the same for each cassette frame 52. As the lock portion 54, male and female lock portions (not shown) may be formed on the cassette frame 52, whereby the female lock portion of one cassette frame 52 is fitted to the male lock portion of the other cassette frame 52. It is preferable that a slide fitting part and a fixing part constitute the lock portion 54. The shape of the lock portion 54 shown in FIG. 8 is one example.

Into the cassette frame 52, the cassette relay block 1 is fixed by its lock arms 4. In place of the cassette relay block 1, the cassette fuse blocks 34, 39, 43 and 47 shown in FIGS. 4 to 7 may be used.

Figure 9:
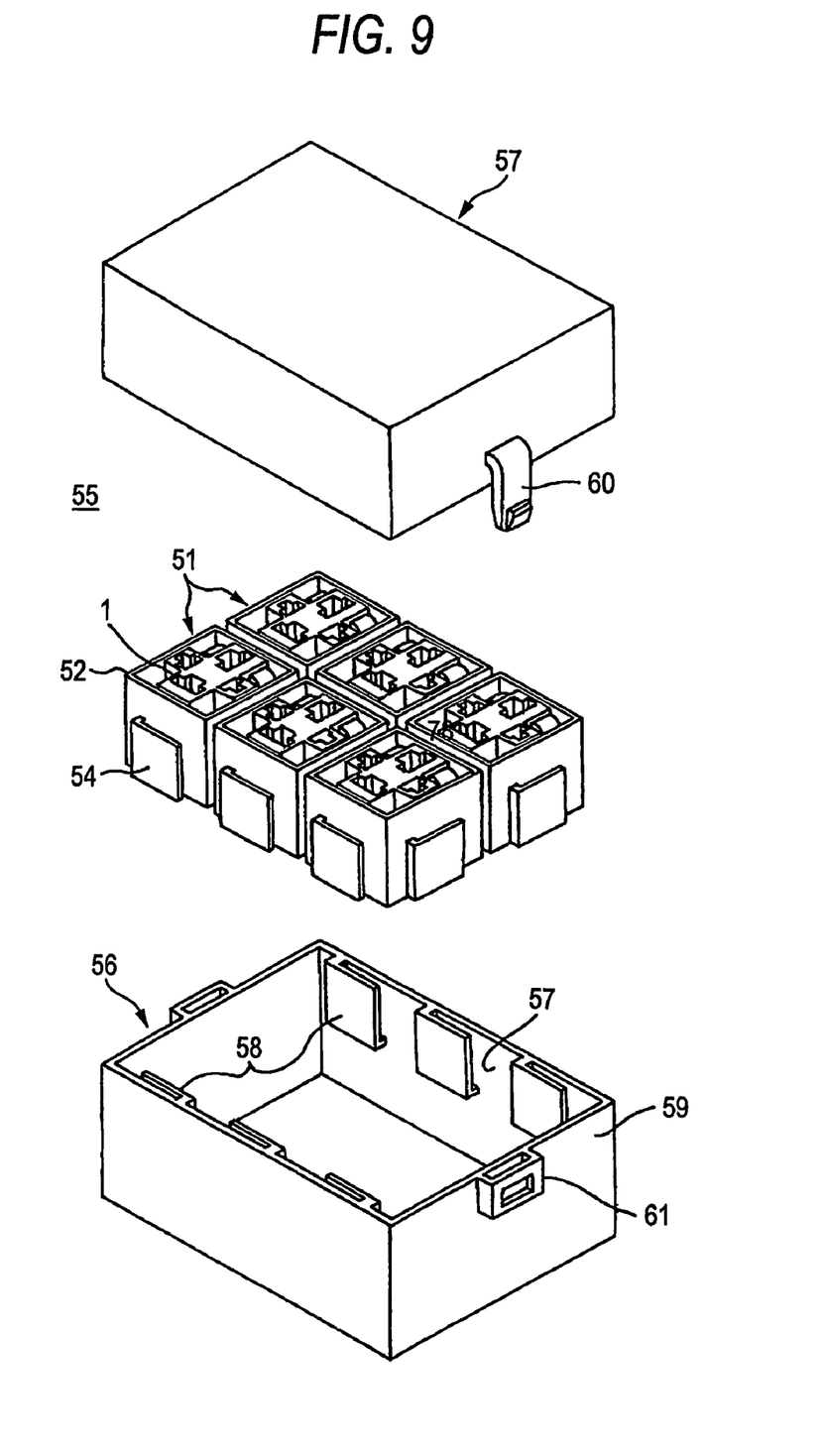
FIG. 9 is an exploded perspective view showing one embodiment of an electric connection box provided with plural relay block assemblies.

FIG. 9 shows the structure in which in a state where the above plural relay block assemblies 51 are coupled to each other, they are inserted and fixed into a connection box body thereby to form an electric connection box 55.

The connection box comprises a bottomed lower cover 56 and a bottomed upper cover 57 which are made of synthetic resin. On an inner wall surface 57 of the lower cover 56, a locked portion (locked means) 58 for a lock portion 54 of a cassette frame 52 of each relay block assembly 51 is provided; and on an outer wall surface 59 of the lower cover 56, a locked portion 61 for a lock portion 60 of the upper cover 57 is provided. Only the lower cover 56 is also referred to as the connection box body.

The lock portions 54 and 60, and the locked portions 58 and 61 shown in FIG. 9 are solely the examples. For example, in case that the lock portion 54 of the cassette frame 52 is a male type, the locked portion 58 of the lower cover 56 becomes a female type. The shape of each locked portion 58 is the same. It is preferable that the locked portion 58 comprises a slide fitting part and a fixing part (not shown) correspondingly to the lock portion 54. The locked portions 58 are arranged in parallel at an equal pitch correspondingly to the common cassette frames 52. As an example, the lock portion 60 of the upper cover 57 is a lock arm, and the locked portion 61 of the lower cover 56 is a fitting frame to which the projection of the lock arm 60 is fitted. On the inner surface of the wall part 59, the similar locked portion 58 may be provided.

Into each cassette frame 52, in place of the cassette relay block 1, the fuse blocks 34, 39, 43, and 47 shown in FIGS. 4 to 7 may be appropriately inserted and attached. Electric wires (not shown) led from the female terminals in the respective cassette electric parts mounting blocks 1, 34, 39, 43, and 47 are led from a hole (not shown) in the lower cover 56 to the outside as a wire harness.

After an electric parts mounting block assembly group comprising the electric parts mounting block assemblies 51 has been housed and fixed into the lower cover 56, a relay and a fuse are attached to each cassette electric parts mounting block 1, and the lower cover is covered with the upper cover 57. The connection box bodies 56 and 57, each electric parts mounting block assembly 51, and electric parts such as the relay and fuse constitute the electric connection box 55.

Not only the plural electric parts mounting block assemblies 51 can be attached into the lower cover 56 in a state where they are coupled, but also the electric parts mounting blocks 51 can be slide-coupled one by one to the locked portions 58 of the lower cover 56 and simultaneously its slide-coupled block 51 can be slide-coupled to the adjacent electric parts mounting block assembly 51 in the lower cover.

Further, the cassette frame 52 of several kinds of shapes may be set, and the several kinds of cassette frames 52 may be used properly in common according to the shape of the cassette relay block 1 or the cassette fuse block 34, 39, 43, 47.

Further, without using the cassette frame 52, plural parts (not shown) each having a housing hole corresponding to the cassette frame 2, 52 may be previously provided for the lower cover (connection box body) 56 integrally, and the electric parts mounting block assembly 1, 34, 39, 43, 47 may be inserted and fixed into each housing hole.

The invention claimed is:

1. A cassette relay block attachment structure comprising:
a cassette relay block having a lock portion disposed inwardly of an outermost wall surface of the cassette relay block, the cassette relay block being inserted into a space surrounded by peripheral walls on an attaching member, said cassette relay block being fixed by the lock portion and a locked portion located on the peripheral wall side of the attaching member;
wherein said lock portion and locked portion are housed in the projected area of a relay attached to said cassette relay block.

2. A cassette relay block attachment structure comprising:
a cassette relay block having a lock portion disposed inwardly of an outermost wall surface of the cassette relay block, the cassette relay block being inserted into a space surrounded by peripheral walls on an attaching member, said cassette relay block being fixed by the lock portion and a locked portion located on the peripheral wall side of the attaching member;
wherein terminal housing parts of said cassette relay block are arranged crosswise, and said lock portion is arranged in a range surrounded by crossing outer wall surfaces of the terminal housing parts.

3. The cassette relay block attachment structure according to claim 1, wherein terminal housing parts of said cassette relay block are arranged crosswise, and said lock portion is arranged in a range surrounded by crossing outer wall surfaces of the terminal housing parts.

4. The cassette relay block attachment structure according to claim 1, characterized in that said lock portion is a flexible lock arm.

5. The cassette relay block attachment structure according to claim 2, characterized in that said lock portion is a flexible lock arm.

6. The cassette relay block attachment structure according to claim 1, further comprising:
a rib provided on the opposite side to said lock portion side and for one of said cassette relay block and said peripheral walls; and
a guide groove for slide engagement with the rib provided for the other.

7. The cassette relay block attachment structure according to claim 2, further comprising:
a rib provided on the opposite side to said lock portion side and for one of said cassette relay block and said peripheral walls; and
a guide groove for slide engagement with the rib provided for the other.

8. The cassette relay block attachment structure according to claim 1, wherein said peripheral walls on the attaching member are formed as a cassette frame.

9. The cassette relay block attachment structure according to claim 2, wherein said peripheral walls on the attaching member are formed as a cassette frame.

* * * * *